United States Patent [19]

Ban

[11] Patent Number: 4,572,448
[45] Date of Patent: Feb. 25, 1986

[54] DRAGGING DEVICE FOR A SPINNING REEL

[75] Inventor: Masuo Ban, Sakai, Japan

[73] Assignee: Shimano Industrial Company Limited, Osaka, Japan

[21] Appl. No.: 653,837

[22] Filed: Sep. 24, 1984

[30] Foreign Application Priority Data

Sep. 30, 1983 [JP] Japan .................................. 58-183922

[51] Int. Cl.$^4$ ....................... A01K 89/01; A01K 89/02
[52] U.S. Cl. .................................. 242/84.5 A; 188/71.5
[58] Field of Search .................... 242/84.5 P, 84.51 A, 242/84.5 A, 84.21 R, 84.2 R, 96; 188/71.5

[56] References Cited

U.S. PATENT DOCUMENTS

| 2,713,463 | 7/1955 | Sarah | 242/84.5 P |
| 4,466,580 | 8/1984 | Toda | 242/84.5 P |
| 4,470,554 | 8/1984 | Kobayashi et al. | 242/84.5 P |

*Primary Examiner*—Billy S. Taylor
*Attorney, Agent, or Firm*—Stevens, Davis, Miller & Mosher

[57] ABSTRACT

A dragging device for a spinning reel applies a rotational resistance to a spool shaft which carries a spool for winding up a fishing line. The dragging device includes a first drag mechanism provided with first dragging members connected to the reel body, second dragging members connected to the spool shaft and rotatable together with the spool shaft, and an adjusting member for bringing these dragging members into press-contact with each other to adjust the dragging force applied to the spool shaft. The dragging device also includes a second drag mechanism provided with a rotary member rotatable with respect to the spool shaft, third dragging members connected to the rotary member, fourth dragging members connected to the spool shaft and rotatable in association with the spool shaft, and a press-contact member to bring all of the dragging members into press-contact with each other. The dragging device also includes a locking mechanism for locking the rotary member to the reel body, thereby preventing the line from being snapped due to a sudden pull by a fish.

8 Claims, 6 Drawing Figures

DRAGGING DEVICE FOR A SPINNING REEL

FIELD OF THE INVENTION

This invention relates to a dragging device for a spinning reel, and more particularly to a dragging device for a spinning reel which rotates a rotary frame by operating a handle to wind up a fishing line onto a spool and applies a resistance by a drag mechanism against rotation of the spool supported to a spool shaft.

BACKGROUND OF THE INVENTION

Generally, during fishing, a spinning reel handle is operated to rotate the rotary frame and to wind the line onto the spool to wind in a hooked fish, at which time there is a risk that the line, when subjected to a large load, will be snapped.

Therefore, in an attempt to avoid this problem, a drag mechanism is incorporated in the reel body of the spinning reel. The drag mechanism has dragging members connected to the reel body, dragging members connected to the spool shaft, and a dragging knob for adjusting the drag force applied by both of the dragging members, the drag knob being operated to apply a desired resistance to rotation of the spool corresponding to the durability of the line.

Where the hooked fish abruptly pulls the line by an unexpectedly large force, the drag knob should be adjusted to reduce the rotational resistance applied to the spool, but such adjustment is difficult to carry out quickly, often resulting in snapping of the line, or too great a reduction in the rotational resistance, thus allowing the hooked fish to escape.

SUMMARY OF THE INVENTION

An object of the invention is to provide a dragging device for a spinnning reel, which uses both a first and a second drag mechanism to apply a desired rotational resistance to a spool shaft, and in which when the fishing line is subjected to a larger pulling force overcoming the durability of the line, the second drag mechanism is not operative, thus rapidly lowering the rotational resistance to the predetermined value, thereby preventing the line from being carelessly cut.

This invention is characterized in that the dragging device for applying the rotational resistance to the spool shaft having the spool comprises a first drag mechanism provided with first dragging members connected to the reel body, second dragging members connected to the spool shaft and rotatable together with the spool shaft, and an adjusting member for bringing the dragging members into press-contact with each other to adjust the dragging effect; a second dragging mechanism provided with a rotary member rotatable with respect to the spool shaft, third dragging members connected to the rotary member, fourth dragging members connected to the spool shaft and rotatable in association with the spool shaft, and a press-contact member for bringing the dragging members into press-contact with each other; and a locking mechanism for locking the rotation of the rotary member at the second drag mechanism i.e. locking the rotary member to the side frame.

An angler using the dragging device of the invention, when the line is subjected to a large pulling force under the condition of applying to the spool shaft the large rotational resistance by both the drag mechanisms, operates the locking mechanism to release the dragging function of the second drag mechanism, thereby enabling the rotational resistance applied to the spool shaft to be immediately lowered to the predetermined value to avoid snapping of the line.

These and other objects of the invention will be seen by reference to the following description, considered in association with the accompanying drawings.

DETAILED DESCRIPTION OF THE INVENTION

Figure 1:
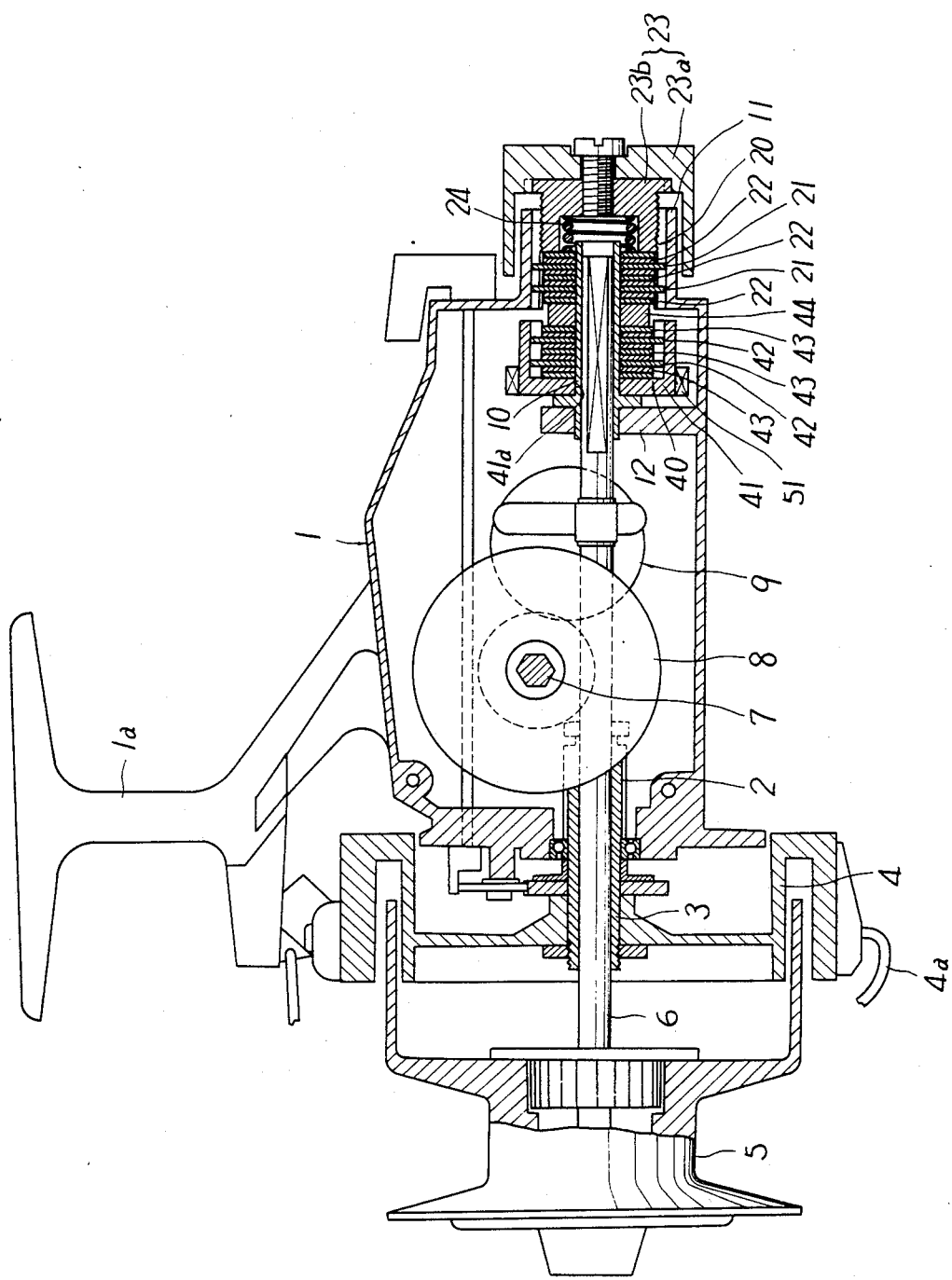
FIG. 1 is a longitudinal sectional view of a first embodiment of a dragging device of the invention.

Referring to FIG. 1, a spinning reel has a hollow reel body 1 provided at its upper surface with a mounting leg 1a for a fishing rod and at the its front wall with a throughbore cylindrical drive shaft 3 is rotatably supported in this throughbore in reel body 1 by means of a bearing. Cylindrical drive shaft 3 has a pinion 2 for meshing with master gear 8. A rotary frame 4 is mounted at the outer periphery of the utmost end of drive shaft 3. Rotary frame 4 has a bail arm 4a. A spool shaft 6 having a spool 5 is supported into the shaft bore of drive shaft 3 in relation of being slidable longitudinally of the reel body 1 and rotatable, and a handle shaft 7 disposed perpendicular by with respect to the axis of drive shaft 3 is supported rotatably to the side wall of reel body 1.

The handle shaft 7 is provided at its portion entering into the reel body 1 with a master gear 8 in mesh with the pinion 2 and at its outwardly projecting portion with a handle (not shown), so that the handle is operated to drive the drive shaft 3 to rotate the rotary frame 4 and to move the spool 5 longitudinally of the reel body 1 through a reciprocation mechanism 9, thereby winding the fishing line onto the spool 5.

Figure 2:
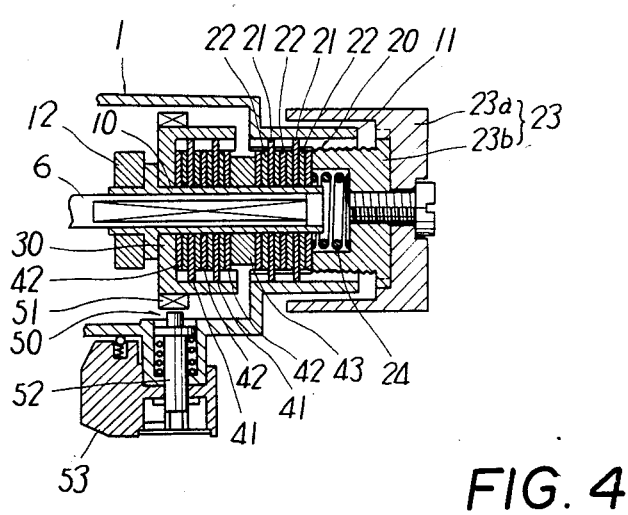
FIG. 2 is a cross-sectional plan view of the principal portion in the FIG. 1 embodiment.
Figure 3:
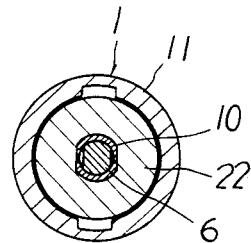
FIGS. 3 and 4 are sectional views of the principal portion at a first drag mechanism.
Figure 4:
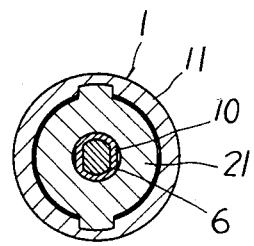

The dragging device of the invention, as shown in FIGS. 1 and 2, is provided at the reel body 1 of the spinning reel constructed as abovementioned and comprises a first drag mechanism 20 comprising dragging members 21 at the reel body side, those 22 at the spool shaft side and rotatable together with the spool shaft 6, and an adjusting member 23 for bringing the dragging members 21 and 22 into press-contact with each other to adjust the dragging action thereof. The dragging device also includes a second drag mechanism 40 comprising a rotary member 41 rotatable with respect to the spool shaft 6, dragging members 42 at the rotary member side and in association with the rotary member 41, dragging members 43 at the spool shaft side and rotatable in association with the spool shaft 6, and a press-contact member 44 for bringing the dragging members 42 and 43 into press-contact with each other. The dragging device also includes a locking mechanism 50 for locking the rotation of rotary member 41.

In detail, at the rear wall of reel body 1 are provided a through bore and a support cylinder 11 extending outwardly therefrom, and a support wall 12 projects inwardly from the inner surface of reel body 1 and rotatably supports a rotary tubular shaft 10 extending longitudinally of the reel body 1 and entering at its rear end into the support cylinder 11. The rear end of spool shaft 6 entering into the reel body 1 is fitted into the rotary tubular shaft 10 in relation of being not-rotatable relative thereto and axially slidable, and the first drag mechanism 20 is provided between the inner peripheral surface of support cylinder 11 and the rear end of rotary tubular shaft 10.

Also, the second drag mechanism 40 is provided at the outer periphery of the front end of rotary tubular shaft 10, and the locking mechanism 50 is assembled between the rotary member 41 in the second drag mechanism 40 and the rear end side-wall of reel body 1.

In more detail, the first drag mechanism 20 supports at the inner periphery of support cylinder 11 the dragging members 21 at the reel body side in relation of being not-rotatable relative to the support cylinder 11 and movable axially thereof. Dragging members 22 at the spool shaft side are supported not-rotatably and axially slidably with respect to the outer periphery of rotary tubular shaft 10. Adjusting member 23 screws with the inner periphery of support cylinder 11, and a spring 24 is interposed between the adjusting member 23 and the dragging member 22 at the spool shaft side, so that the adjusting member 23 is rotatably operated to bring the dragging members 21 and 22 at the reel body and spool shaft sides into press-contact with each other.

The adjusting member 23 shown in the drawings comprises an initial load setting knob 23a for setting a rotation starting load on the spool shaft 6 and an adjuster 23b detachably engageable with the knob 23a, the adjuster 23b screwing with the inner periphery of support cylinder 11.

The rotary member 41 at the second drag mechanism 40 is formed as a bottomed cylinder and has a through bore 41a at its bottom portion so that the bore opening within the cylindrical portion of rotary member 41 is disposed opposite to i.e., faces the first drag mechanism 20. Rotary member 41 is supported onto the rotary tubular shaft 10 rotatably by means of through bore 41a.

The dragging members 42 at the rotary member side are supported not-rotatably but axially slidably onto the inner periphery of rotary member 41, and the dragging members 43 at the spool shaft side are supported onto the outer priphery of rotary tubular shaft 10 in relation of being not-rotatable relative thereto and slidable axially thereof. Press-contact member 44 is interposed between the dragging member 43 at the spool shaft side in the second drag mechanism 40 and the dragging member 22 at the spool shaft side in the first drag mechanism 20 and is supported not-rotatably relative to the rotary tubular shaft 10 and axially slidably with respect thereto. Hence, the adjusting member 23 in the first drag mechanism 20 is rotatably operated to bring the dragging members 21 and 22 into press-contact with each other so that the press-contact member 44 is cause to slide axially through the action of both the dragging members 21 and 22 to bring the dragging members 42 and 43 in the second drag mechanism 40 into press-contact with the bottom wall of rotary member 41, thereby applying a desired rotational resistance to the spool shaft 6.

The locking mechanism 50, as shown in FIG. 2, comprises a splined retainer 51 provided circumferentially on the outer periphery of rotary member 41, a locking member 52 supported to the side wall of reel body 1 and operable to advance or retract with respect to the retainer 51, and an operating member 53 of a lever-like shape for operating the locking member 52. Operating member 53 is operated, e.g., through conventional cam means not specifically illustrated, to advance the locking member 52 to engage with the retainer 51 to thereby lock the rotary member 41, thus actuating the second drag mechanism 40. In detail, since the rotary member 41, when locked, is stationary with respect to the spool shaft 6, a resistance is given against rotation of spool shaft 6, this resistance being transmitted to the spool shaft side dragging member 43 through the rotary tubular shaft 10. Thus when a torque applied to the spool shaft side dragging member 43 overcomes a frictional force generated by press-contact of dragging members 43 at the spool shaft side with those 42 at the rotary member side, a slip is created between both the dragging members 42 and 43, whereby the spool shaft 6 is subjected to a resistance. When the operating member 53 is operated to release the engagement of locking member 52 with the retainer 51, the rotary member 41 and dragging members 42 at the rotary member side rotate together with the spool shaft 6 so that the second drag mechanism 40 is not-operative. In other words, the rotary member 41, when released, rotates integrally with the spool shaft 6 through the dragging members 42 and 43, thereby causing no slip therebetween and releasing the dragging action of the second drag mechanism 40.

When using the spinning reel having a dragging device constructed as abovementioned, the adjusting member 23 is rotated to bring the dragging members 21, 22, 42 and 43 in both the first and second drag mechanisms 20 and 40 into press-contact with each other so as to preset a rotational resistance of a desired value on the basis of press-contact forces of both the first and second drag mechanisms 20 and 40 as a whole.

When the locking member 52 has locked the rotary member 41 during the fishing, the spool 5 winds up the line with the rotational resistance preset as abovementioned to thereby catch a hooked fish.

Where the rotational resistance on the spool shaft 6 resulting from the dragging functions of both the drag mechanisms 20 and 40 exceeds the durability of the line, for example when a hooked fish pulls the line intensely to cause a risk of cutting the line, the operating member 53 is operated, e.g., manually, to release the rotary member 41 and the second drag mechanism 40 is idle, whereby the aforesaid rotational resistance is immediately reduced to that caused only by the first drag mechanism 20. Hence, the spool shaft 6 rotates to relieve the line from being overloaded.

Incidentally, when the pulling force of a hooked fish decreases, the rotary member 41 need only be locked by the locking member 52 operated by the operating member 53, thereby reactuating the second drag mechanism 40.

Figure 5:
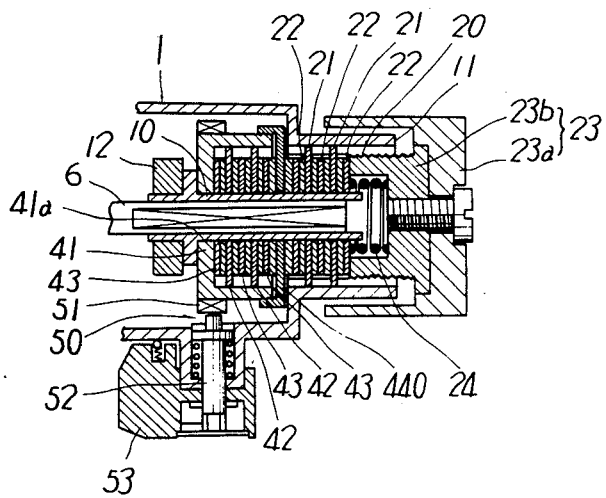
FIG. 5 is a cross-sectional plan view of the principal portion in a second embodiment.
Figure 6:
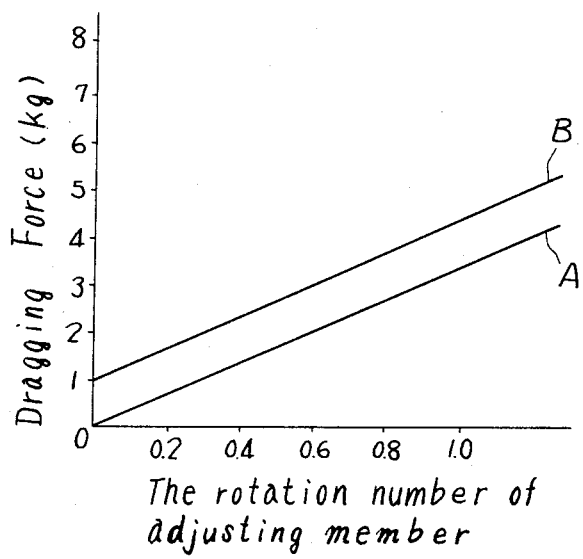
FIG. 6 is a graph of the characteristics of the dragging device shown in the second embodiment.

Alternatively, the adjusting member 23, even when operated, may not act on the second drag mechanism 40 as shown in FIG. 5.

In detail, in FIG. 5, a press-contact member 440 at the second drag mechanism 40 is formed as a bottomed cylinder having a through bore at its bottom and screws at its bore opening with the outer periphery at the opening of rotary member 41 in relation of being rotatable with respect to the rotary tubular shaft 10. Hence, the press-contact member 440 is screwably operated to bring the dragging members 42 and 43 at the second drag mechanism 40 into press-contact independently of the press-contact of dragging members 21 and 22 at the first drag mechanism 20.

In this case, when the locking mechanism 50 locks the rotation of rotary member 41, the drag characteristic A of the first drag mechanism 20 and that of the second drag mechanism 40 are combined to obtain the combined drag characteristic B. When the locking mechanism 50 releases the rotary member 41, the drag characteristic can be moved in parallel from the combined characteristic B to the characteristic A, and when the locking mechanism 50 locks the rotation of rotary member 41, the same moves in parallel and returns to the combined drag characteristic B.

The drag device for the spinning reel of the invention provided with the first drag mechanism, second drag mechanism, and locking mechanism as abovementioned, can of course give to the spool shaft a desired rotational resistance, and when the line is subjected to a pulling force overcoming the durability of the line, the second drag mechanism can be made non-operative by releasing the rotary member so that the rotational resistance applied to the spool shaft is reduced to that of a desired value derived only from the first drag mechanism, thereby reliably preventing the line from being cut.

Although several embodiments have been described, they are merely exemplary of the invention and are not to be construed as limiting, the invention being defined solely by the appended claims.

What is claimed is:

1. A dragging device for a spinning reel including a reel body, a spool shaft slidable longitudinally relative to the reel body and a spool mounted on the spool shaft, said dragging device applying a rotational resistance force against rotation of said spool shaft and comprising a first drag mechanism and a second drag mechanism each for applying a rotational resistance force against rotation of said spool shaft; said first drag mechanism comprising first dragging members connected to said reel body, second dragging members connected to said spool shaft, said second dragging members being rotatable together with said spool shaft, and an adjusting means for bringing said first and second dragging members in press-contact with each other to adjust an amount of said rotational resistance force applied against rotation of said spool shaft; said second drag mechanism comprising a rotary member rotatable with respect to said spool shaft, third dragging members connected to said rotary member, fourth dragging members connected to said spool shaft, said fourth drag members being rotatable with said spool shaft, and a press-contact means for bringing said third and fourth dragging members into press-contact with each other, said dragging device further comprising a locking mechanism interposed between said rotary member and said reel body to lock said rotary member to said reel body to prevent said rotary member from rotating with said spool shaft.

2. A dragging device for a spinning reel as set forth in claim 1, wherein said spool shaft includes a rotary tubular shaft which is non-rotatable relative to said spool shaft and movable axially thereof, said rotary tubular shaft supporting said first, second, third and fourth dragging members, said press-contact member being interposed between said first drag mechanism and said second drag mechanism, said adjusting member cooperating with said press-contact member to adjust a rotational resistance force applied by each of said first and second drag mechanisms against rotation of said spool shaft.

3. A dragging device for a spinning reel as set forth in claim 1, wherein said rotary member comprises a cylinder having a bottom portion and said third and fourth dragging members are housed in a bore in said cylinder, said press-contact member causing said third and fourth dragging members to make press-contact with said bottom portion of said cylinder, said press-contact member being fixed to said rotary member.

4. A dragging device for a spinning reel as set forth in claim 3, wherein said press-contact member is fixed to said rotary member by a screw means and a position of said press-contact member relative to said rotary member is adjustable to thereby enable adjustment of a rotational resistance force applied by said second drag mechanism against rotation of said spool shaft.

5. A dragging device for a spinning reel as set forth in claim 1, wherein said rotary member includes a round outer periphery, said locking mechanism comprises a retaining portion formed on the round outer periphery of said rotary member and, a locking member supported to said reel body and operable to advance or retract with respect to said retaining portion, said locking member having an operating member for causing said locking member to advance or retract with respect to said retaining portion to lock said rotary member to said reel body.

6. A dragging device for a spinning reel as set forth in claim 1, wherein said first drag mechanism is disposed at a rear portion of said reel body and said second drag mechanism is disposed in front of said first drag mechanism, said locking member at said locking mechanism being disposed at a lateral side of said reel body.

7. A dragging device for a spinning reel as set forth in claim 6, wherein a support cylinder projects from a rear portion of said reel body, and said adjusting member comprises a cylinder having on an outer periphery thereof an operating unit adapted to enable hand-adjustment of said adjustment member, said adjusting member being screwably connected with said support cylinder.

8. A dragging device for a spinning reel as set forth in claim 7, wherein said operating member for said locking member comprises a lever.

* * * * *